(12) United States Patent
Kurne et al.

(10) Patent No.: US 9,183,205 B1
(45) Date of Patent: Nov. 10, 2015

(54) USER-BASED BACKUP

(71) Applicant: Symantec Corporation, Mountain View, CA (US)

(72) Inventors: Abhijit Subhash Kurne, Pune (IN); Pillai Biju Shanmugham, Pune (IN); Mandar Raghunath Upadhye, Pune (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/645,678

(22) Filed: Oct. 5, 2012

(51) Int. Cl.
*G06F 17/30* (2006.01)
(52) U.S. Cl.
CPC .............................. *G06F 17/30073* (2013.01)
(58) Field of Classification Search
None
See application file for complete search history.

(56) References Cited

U.S. PATENT DOCUMENTS

| | | | | |
|---|---|---|---|---|
| 2008/0250084 A1* | 10/2008 | Polimeni | ....................... | 707/204 |
| 2008/0307175 A1* | 12/2008 | Hart et al. | ...................... | 711/162 |
| 2009/0006640 A1* | 1/2009 | Brouwer et al. | .............. | 709/231 |
| 2010/0145917 A1* | 6/2010 | Bone et al. | .................... | 707/694 |
| 2010/0198888 A1* | 8/2010 | Blomstedt et al. | ............ | 707/827 |
| 2010/0269164 A1* | 10/2010 | Sosnosky et al. | ................. | 726/7 |
| 2013/0262392 A1* | 10/2013 | Vibhor et al. | ................. | 707/654 |

OTHER PUBLICATIONS

U.S. Appl. No. 61/618,506, filed Mar. 30, 2012.*

* cited by examiner

*Primary Examiner* — Jay Morrison
(74) *Attorney, Agent, or Firm* — Campbell Stephenson LLP

(57) ABSTRACT

Various systems and methods for creating a user-based backup. For example, one method can involve receiving a request to perform a backup operation. The request includes information that identifies a user. The method also involves selecting a set of data objects based on detecting that the set of data objects is associated with the user. The set of data objects is a subset of the objects stored on one or more storage devices. The generated user-based backup will include only the data objects in the set, that is, only data objects that are associated with the user identified in the request to perform the backup operation.

22 Claims, 10 Drawing Sheets

USER-BASED BACKUP

FIELD OF THE INVENTION

This invention relates to data management and, more particularly to creating user-based backups.

DESCRIPTION OF THE RELATED ART

In order to prevent data loss, data is backed up. A user, such as a backup administrator, configures backup operations. Configuring backup operations involves specifying what data is to be backed up as well as various other parameters, such as when the data is to be backed up, the type of backup operation to perform, and the like. Specifying what data is to be backed up can include selecting one or more host computers, applications, or other content sources from which data will be backed up. Performing the backup operation typically involves creating a copy of the specified data (e.g., host or application) and storing the copy of the data in backup storage.

In certain situations, it is desirable to create a backup of data associated with a single user. For example, in a scenario involving litigation, it may be desirable to preserve all files owned by a particular user. However, a particular user's data (e.g., files) can be scattered among multiple locations. It is often difficult or impossible for a backup administrator to know what locations should be included in a backup operation to ensure that all of a user's data is captured in the backup operation. Furthermore, traditional backup systems are commonly configured to perform host-based and/or application based backup operations. Even if location information regarding all of a user's data were known, re-configuring existing traditional backup systems to perform user-based backup operations and store data accordingly may be difficult or impossible in some instances.

BRIEF DESCRIPTION OF THE DRAWINGS

The present invention may be better understood, and its numerous objects, features and advantages made apparent to those skilled in the art by referencing the accompanying drawings.

Figure 1:
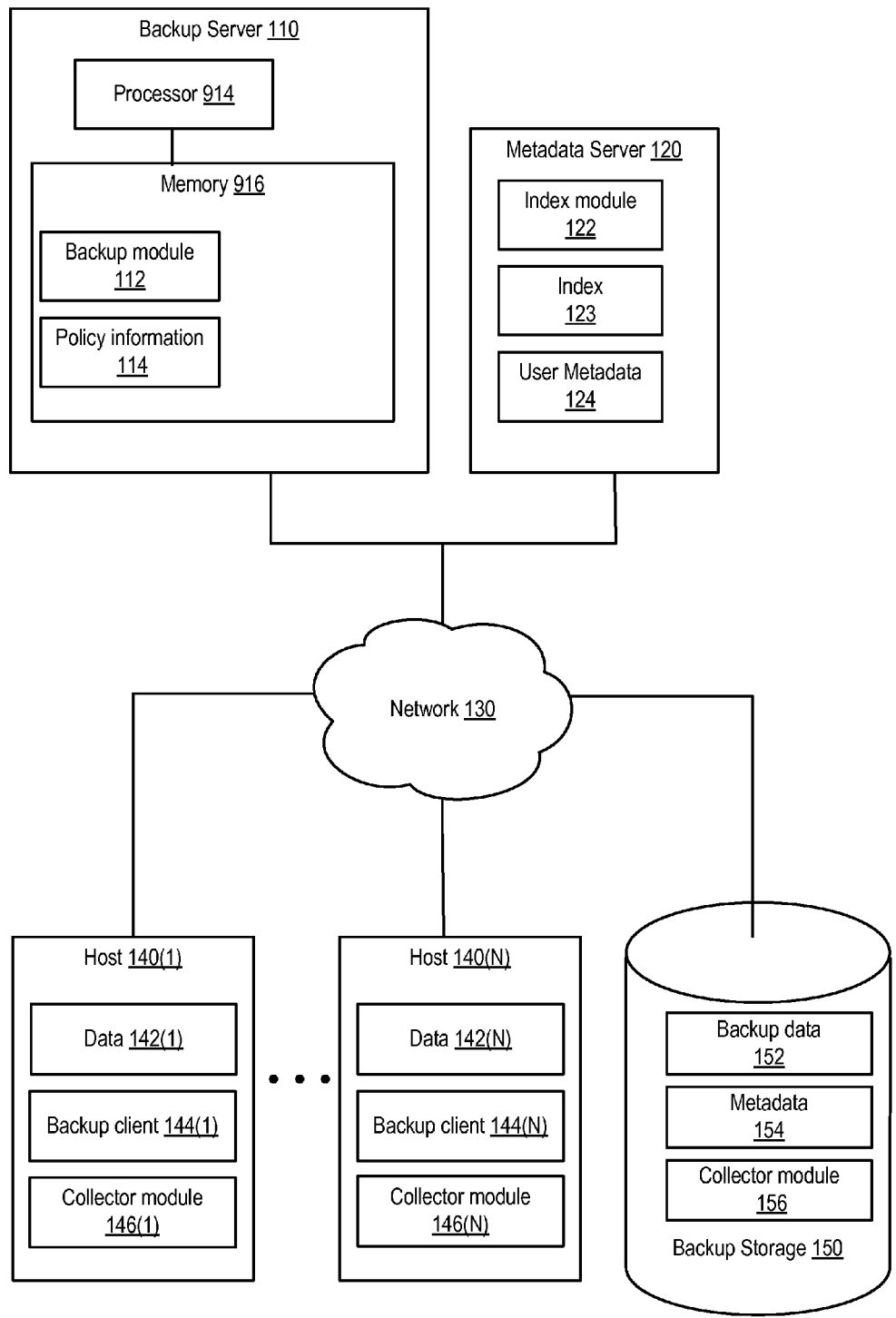
FIG. 1 is a block diagram of a system that can create user-based backups, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

In certain situations, it is be useful to create a backup image that contains data associated with a single user. For example, if an employee (user) leaves a business (e.g., retires), the employee's data can be backed up to secondary storage and removed from primary storage. In another example, a legal request for disclosure can specify that all data associated with a particular user be produced.

Creating a backup of the user's data involves a backup administrator configuring a backup operation to include all locations in which the user's data is stored. If the backup administrator fails to specify locations in which the user's data is stored, the data from those locations is not included in the backup of the user's data. The resulting backup is incomplete since it does not include all of the user's data.

Configuring a backup operation to backup all data associated with a user can be frustrated by the fact that determining where the user's data is stored can be difficult or impossible. The user's data can be scattered among a number of different data sources, such as different host computers or application data stores. Additionally, the user's data can be included in a number of backup images from previously executed backup operations. Even if it were possible to determine all locations a user's data were stored, conventional backup systems are typically not configured to perform backup operations based on a given user or store data according to a user associated with the data. Traditionally, backups have always been location or host-based and in certain cases, application-based. This has resulted into huge legacy repositories of backup images that were created as a result of host-based or application-based backups. As such, these images contain either files from a single location (host or location-based backups) or files pertaining to a single application (application-based). However, legal scrutiny can extend beyond archives and into backup data repositories, making the ability to organize and present backup data on a per-user basis desirable. Most legal queries are user-centric. Searching and finding data corresponding to a user can be accomplished. Restoration and any post-processing of such data is often inefficient because the underlying backup images are not user-centric. Using traditional backup systems to generate user-based backups would, in some cases, involve multiple backup passes on the same server. Doing so would require a larger backup window. Nonetheless, a user-based backup can be utilized, for example, to expedite responding to litigation and other demands related to eDiscovery.

To identify all locations that store a user's data, a backup administrator can manually search some or all of the available data sources to determine which sources include the user's data. However, given that there may be many thousands of sources, e.g., in an enterprise-wide network, manually searching through the sources is impractical. Alternatively, the backup administrator can guess which sources might include a user's data. However, this approach includes the significant risks that: a) the backup administrator may guess incorrectly and thereby include unnecessary sources in the backup; and b) the backup administrator may miss sources, e.g., if the user has data stored in unexpected locations. As can be seen, existing methods of backing up data are inadequate for creating backups that include all data associated with a single user. These methods run the risk of either missing some of the data that should be backed up, and/or backing up data unnecessarily, e.g., data that is not associated with the user. Selection of data for backup based on the data's owner rather than the machine where the resides involves, in one embodiment, integrating backup programs with data management programs to provide a functionality that enables backup administrators to search for data of a specific person and backup the data without the backup administrator knowing the location of data, e.g., which machines the data is stored on. For example, a data management program can improve data governance through insights into the ownership, usage and lifecycle of unstructured data, including, for example, files such as documents, spreadsheets, and emails. Such data management capabilities can include providing metadata of source data (e.g., owner and location data). This metadata can be used in backup selection while configuring a backup operation for a specific person.

FIG. 1 is a block diagram of a system configured to create user-based backups. As shown, the system includes backup server 110 and metadata server 120. These servers are coupled to a number of hosts 140(1)-140(N), collectively referred to as hosts 140, and backup storage 150 via network 130. Network 130 can include a WAN (Wide Area Network), such as the Internet, one or more LANs (Local Area Networks), and/or one or more SANs (Storage Area Networks).

It will be noted that the variable identifier "N" is used to more simply designate the final element of a series of related or similar elements (e.g., backup clients). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified may hold the same or a different value than other instances of the same variable identifier.

Backup server 110 is configured to perform backup operations. Backup server 110 is a computing device such as a personal computer, laptop computer, server, personal digital assistant, cell phone, or the like. Backup server 110 includes at least one processor 914 and a memory 916. Memory 916 stores program instructions executable by processor 914 to implement a backup module 112 and policy information 114.

Backup module 112 is used to configure and control backup operations. Backup module 112 communicates with backup clients 144 to perform backup operations. Backup module 112 receives input from a user (e.g., a backup administrator) specifying what types of backup operations are to be performed. This input is stored in policy information 114.

Policy information 114 includes information that can be logically compiled to form one or more conceptual structures known as backup policies. Policy information 114 also includes metadata regarding the policies, such as ownership and age information for each policy. Each policy includes information regarding backup operations. A policy identifies the location, or source, of data that is to be backed up. For example, a policy can identify one or more hosts 140 which are the sources for backup operations that backup data 142 from the hosts 140 to backup storage 150. For each host identified by the policy, the policy can include a set of rules that dictate the manner in which backup operations are performed for the hosts, such as the frequency that the host is backed up, a scheduled time to begin a backup operation, the type backup operation to use (e.g., full or incremental), the location of backup storage, a priority associated with the host, a retention scheme that applies to host data, one or more error handling mechanisms applicable to the host, and the like. In addition to identifying which hosts are affected by a policy, the policy can identify what data on the hosts is affected by the policy. For example, the policy can identify a particular file system, volume, disk drive, and the like for one or more of the hosts. The policy can also specify data processing rules for the hosts, such as encryption and compression rules, and/or application-specific rules. Policy information 114 can be stored as a file, as a record in a database, or using some other appropriate construct.

Based on policy information 114, backup module 112 initiates backup operations for one or more of hosts 140. The policy information can explicitly identify a type of backup operation. Alternatively, backup module 112 can automatically select a type of backup operation in response to one or more specified criteria (as might be specified by a user). Such a selection can be based on a backup rule included in policy information 114. For example, if user input specifies that a first host 140 is assigned a first priority and a second host 140 is assigned a second priority, backup module 112 can access a backup rule and automatically determine what type of backup operation to perform for the first host 140 and what type of backup operation to perform for the second host 140. Backup module 112 can select, for example, whether the backup operation should be full or incremental, a location in which to store backed up data, how often to perform the backup operation, and the like.

Backup module 112 is configured to perform a host-based backup. A host-based backup involves backing up some or all of the data, such as data 142, which is stored on or accessed by the host. In the embodiment depicted in FIG. 1, a backup administrator configured a backup policy by specifying that a given host be backed up. When the policy is implemented and a backup operation performed, data from the specified host is backed up. Backup module 112 can also perform an application backup. For an application based backup, a backup administrator modifies a backup policy by specifying a particular application or applications. When the policy is implemented, and a backup operation performed, backup module 112 identifies some or all data associated with the application(s) and performs a backup of that data. The resulting backup image includes data associated with the application.

In one embodiment, a backup administrator can configure a policy to create a user-based backup. A user-based backup includes data for one or more users specified, for example, by the backup administrator. Unlike a host-based backup, which backs up data from a single host, or an application backup, which backs up all data used by a single application, a user-based backup backs up some or all data associated with a single user and can include data from multiple hosts and/or content sources, e.g., applications.

In response to a backup administrator specifying a user-based backup, backup module 112 communicates with metadata server 120 to determine locations of the data that is associated with the user (e.g., data owned, modified, and/or accessed by the user). Backup module 112 generates a query that includes information identifying the user, such as the user's name or role within an organization, and transmits the query to metadata server 120. In response to receiving the query, metadata server 120 accesses user metadata 124 and generates a list of locations, e.g., hosts and/or specific paths, at which data associated with the user is stored. Metadata server 120 transmits the list to backup module 112. Backup module 112 then selects the locations to be included in a backup operation and schedules the backup operation. When backup module 112 performs the backup operation, backup module 112 creates a backup image that includes data from the specific locations and stores the backup image in backup storage 150. Such data includes only data associated with the specified user.

Metadata server 120 is configured to gather, organize, and distribute metadata. Metadata server 120 includes an index module 122, and index 123, and user metadata 124. Index module 122 receives metadata from the collector modules 146, indexes the metadata to form index 123, and stores the metadata as user metadata 124. The metadata can include information indicating which data is associated with which user. For example, for each data object stored in data 142, the metadata can indicate a user who owns the data, one or more users who have accessed and/or modified the data, and the like. The metadata can also include data location information (e.g., host name and path), permissions, date of creation and modification, and the like. In one embodiment, metadata server 120 also hosts a web-based graphical user interface (GUI), scans obtain information about users that have access to data, and correlates this information with the access events. Metadata server 120 also ensures that collector modules are configured, synchronizes configuration of the collector modules with configuration data of metadata server 120, and authenticates users to access metadata server 120 and collector modules 146.

Each host 140 includes a computing device such as a personal computer, laptop computer, server, personal digital assistant, cell phone, or the like. Each host 140 includes a backup client 144, a collector module 146, and data 142. Backup clients 144 are configured to execute backup operations in which a copy of data used by the host, such as data 142, is created and stored in a storage device, such as backup storage 150. Backup clients 144 can execute any type of backup operation, including full backups or incremental backups. A full backup involves backup client 144 creating a complete copy of data 142 and storing the complete data copy in storage device 150. An incremental backup involves backup client 144 identifying data that has been changed since a previous backup operation and copying the changed data (excluding the unchanged data) to storage device 150. Backup clients 144 can also perform physical or logical backups. In the case of a logical backup, backup client 144 can perform a backup operation at one or more of multiple levels, such as at a file level and/or at a volume level.

Collector module 146 collects metadata regarding data 142 and transmits the metadata to metadata server 120. In one embodiment, collector module 146 transmits the metadata to metadata server 120 in response to a request from metadata server 120. Alternatively, collector module 146 automatically transmits the metadata in response to detecting an event or occurrence, such as periodically, or in response to detecting that a pre-specified amount of metadata has been collected. As shown, each host 140 includes a single collector module 146. In one embodiment, a collector module 146 can be associated with a content source, such as a particular application, rather than a specific host 140. Each host 140 can include multiple collector modules 146. In one embodiment, the collector module monitors each data object included in data 142. When new data objects are created or existing data objects are modified, deleted, or otherwise accessed, collector module 146 stores the updated metadata to reflect the change. Collector module 146 can store the updated metadata, e.g., in a list and subsequently transmit the updated metadata to metadata server 120. For example, collector module 146 detects access events available on host 140 that report the read, write, create, delete, and rename activity on data objects on host 140, e.g., in a file system. The access events are processed in batches that can consist of several thousand events. Each batch of events collected in a cycle is stored in a separate file with appropriate timestamp that indicates the ending time of the last entry in that batch. This data is pruned based on events that are not included in monitored storage and is then segregated based on storage location, application, user, or any other specified criterion. The resulting data is periodically shipped to metadata server 120. Collector module 146 scans file system hierarchies and collects access events from Network Attached Storage (NAS) devices. Metadata server 120 uses this information to perform advanced reporting regarding users associated with data and the access history of the data. Collector module 146 is configured to scans data repositories by mounting the data store. Collector module 146 also captures file system hierarchy information and collects in-depth information about files, folders, and any other data objects.

Data 142 can include multiple data objects. A data object can be any logical or physical unit of storage, such as a block, chunk, segment, disk drive, extent, file, database, directory, file system, volume, and the like. One or more applications (not shown) can access data 142. For example, an application such as a word processing program, email program, graphic editing program, database application, server program, or the like can read from or write to data 142.

Backup storage 150 provides persistent data storage, such that data stored on backup storage 150 will remain stored even after the storage device is powered off. Storage device 150 can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Backup storage 150 can also be a virtual or logical storage device that is implemented on such physical storage devices and/or storage systems. For example, backup storage 150 can be a logical volume that is implemented on a RAID storage system. Additionally, backup storage 150 can include one or more storage devices. Backup storage 150 can also include one or more types of storage media, including solid state media (e.g., flash drives), optical media (e.g., CDs and DVDs), and magnetic media (e.g., hard disks or magnetic tape). In some embodiments, backup storage 150 can be implemented using cloud storage, in which the storage device is a logical storage device to which physical storage device(s) are allocated on an as-needed and/or as-contracted basis.

As depicted in FIG. 1, backup storage 150 stores backup data 152, metadata 154, and collector module 156. Backup data 152 includes one or more backup images. A backup image includes a backup copy of the contents of a given storage entity, such as a directory, volume, file system, disk drive, and the like. A backup image can include data from a full backup and/or one or more incremental backups.

Metadata 154 includes data regarding backup data 152, such as one or more backup catalogs that indicate which files are stored in the backup data. A backup catalog is created or updated during a data protection process, such as a backup process. A backup catalog is a data store that contains information about one or more backup images created according to a policy. Every data object, such as a file, contained in one or more backup images is catalogued by backup module 112 in a backup catalog during creation of the one or more backup images. A backup catalog entry is created for every data object contained in a backup image. For each data object, a backup catalog includes a path name of the data object, a modification time of when the data object was modified, and a user name and group name of an owner assigned to the data object. A backup catalog can also include additional information about a data object, such as an identification of a backup image in which the data object is located, an identification of a storage device in which the backup image is located, and an identification of a policy by which the backup image was created. A path name includes a data object name and information about the type of data object, such as a file type.

Similar to collector modules 146, collector module 156 collects metadata and transmits the metadata to metadata server 120. Specifically, collector module 156 collects information regarding users associated with data objects stored in backup data 152. This involves collector module 156 accessing metadata 154, e.g., parsing one or more backup catalogs stored in metadata 154. Collector module 156 can determine, based on information in metadata 154, user information for the data stored in backup data 152, such as which user owns data objects in backup data 152. In one embodiment, collector module 156 transmits the metadata in response to a request from metadata server 120. Alternatively, collector module 156 automatically transmits the metadata in response to detecting an event or occurrence, such as periodically, or in response to detecting that a pre-specified amount of metadata has been collected.

Figure 2:
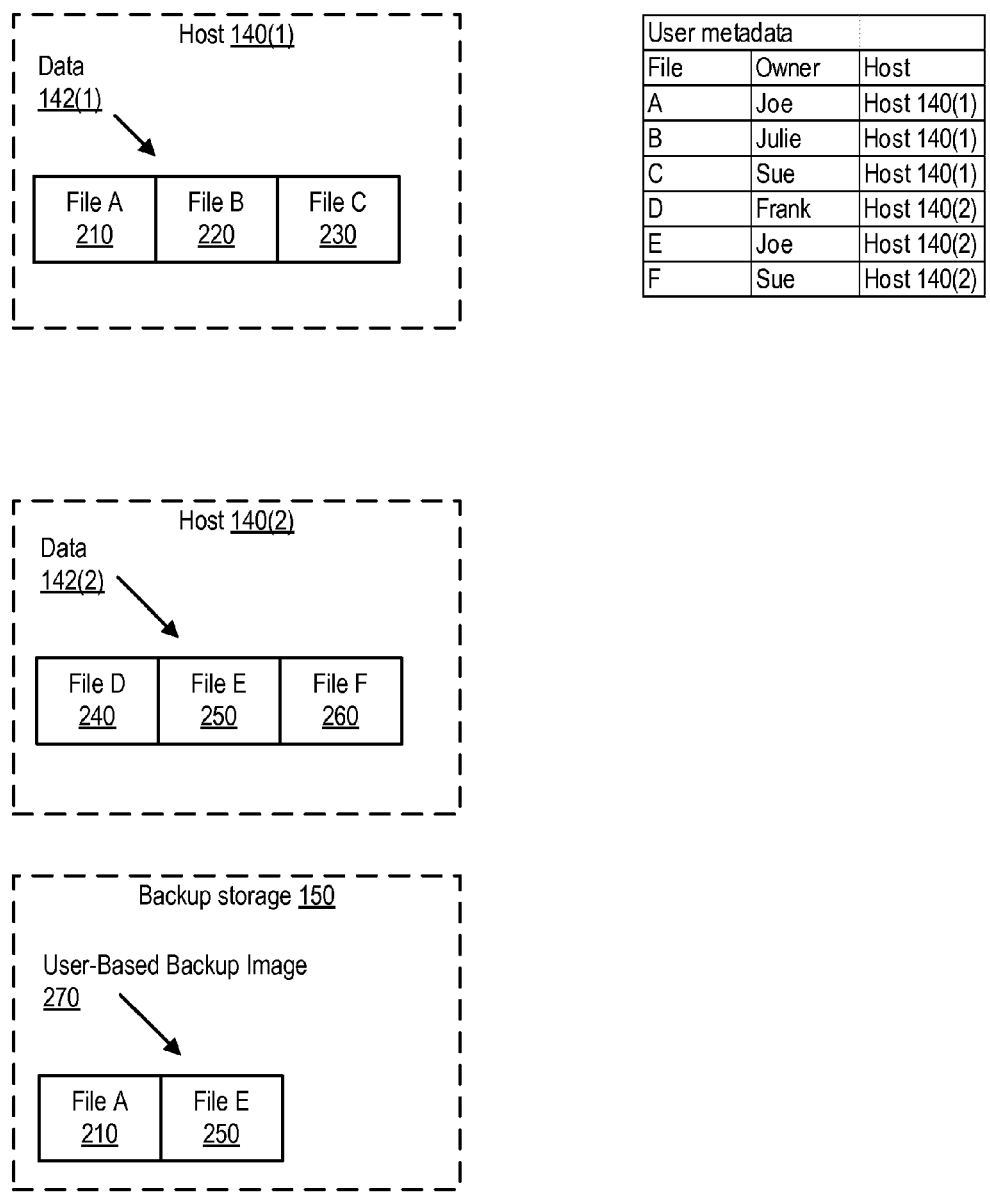
FIG. 2 is a diagram illustrating how data from a plurality of hosts is included in a user-based backup image, according to one embodiment of the present invention.

FIG. 2 is a diagram illustrating an example of creating a user-based backup image 270. Data from a plurality of hosts is included in user-based backup image 270. A portion of data 142(1) from FIG. 1 is shown, including File A 210, File B 220, and File C 230. Also shown is a portion of data 142(2) from FIG. 1, including File D 240, File E 250, and File F 260. User metadata, such as collected by collectors 146 of FIG. 1 and stored in user metadata 124 on metadata server 120 of FIG. 1, indicates that a user with the user name Joe is the owner of File A and File E.

In response to a command (e.g., from a backup administrator) specifying that a user-based backup be generated for a user named Joe, a backup module, such as backup module 112 of FIG. 1, creates user-based backup image 270. User-based backup image 270 includes backup copies of File A and File E, the two files that are owned by user Joe. Other files on hosts 140(1) and 140(2) are not included in the user-based backup image, since they are not associated with Joe. The backup module stores the user-based backup image in backup storage, such as backup storage 150 of FIG. 1. In one embodiment, the backup storage includes large numbers of backup images stored, for example, on tapes and/or disks. A backup administrator receives a query, e.g., from a legal department, related to a litigation. The query includes information identifying a user or set of users. The query indicates that the backup administrator is to produce all data associated with the users, e.g., data that is owned, modified, or accessed by the users. The query also includes a specified time period within which the query is to be complied with, e.g., within which the data is to be produced. Additionally, the query can specify a date range to look for data created, altered, deleted, or otherwise accessed by the users, during that time. In response to receiving the query, the backup administrator identifies data associated with to each user. In one embodiment, the backup administrator searches one or more catalogs to identify the files and the images that satisfy the query, e.g., that were accessed by the users. The backup administrator can export the search results into a standard format, such as an extensible markup language (XML) document. The search results can include mappings that identify file and backup image relationship information, such as which files are included in which backup images. The backup administrator then selects a set of search results and exports the selected results. The backup administrator can create a synthetic user-based backup (SUBB) image from the search results. In one embodiment, a synthetic user-based (SUBB) backup image is created, for example, out of host-based backups. The SUBB includes all versions of all the data objects within a given date range, rather than just a single version. In one embodiment, the backup administrator can generate a SUBB that is implemented as a physical backup image. The physical backup image can be shared or transported, especially with a remote legal team that lacks the capability to access the backup storage directly. This allows the legal team to import and restore the SUBB image to get the data set in response to a query. Alternatively, the backup administrator can generate a SUBB that is implemented as a logical data set that can be used to later form a physical SUBB backup image. Since synthesizing the user data can happen in the background and in off hours, it reduces any possible impact on the performance of backup operations.

Figure 3:
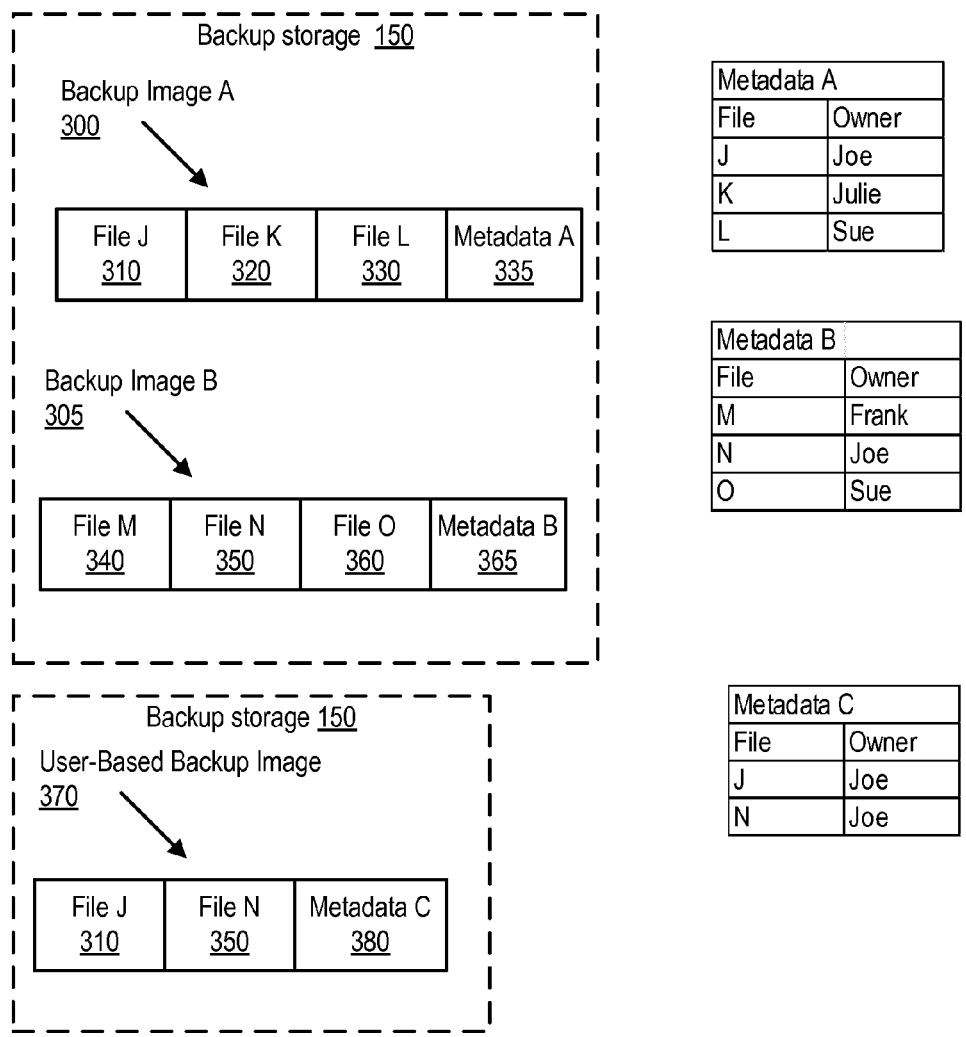
FIG. 3 is a diagram illustrating how data from a plurality of backup images is included in a user-based backup image, according to one embodiment of the present invention.

FIG. 3 is a diagram illustrating another example of creating a user-based backup image. In this example, data from a plurality of backup images is included in user-based backup image 370. A plurality of backup images is shown, including backup image A 300 and backup image B 305. Backup image A 300 includes backup copies of file J 310, file K 320, and file L 330, as well as metadata A 335. Metadata A can be implemented as a backup catalog and can be included in backup image A or can be stored separately, e.g., in metadata 154 of FIG. 1. Metadata A includes information identifying users associated with each file in backup image A. Backup image B 305 includes file M 340, file N 350, and file O 360, as well as metadata B 365. Metadata B can be implemented as a backup catalog and can be included in backup image B or can be stored separately, e.g., in metadata 154 of FIG. 1. Metadata B includes information identifying users associated with each file in backup image B.

In response to a command (e.g., from a backup administrator) specifying that a user-based backup be generated for a user named Joe, a backup module, such as backup module 112 of FIG. 1, creates user-based backup image 370. User-based backup image 370 includes backup copies of file J 310 and file N 350, the two files that are owned by user Joe. Other files in backup image A and backup image B are not included in backup image 370, since they are not associated with Joe. The backup module stores the user-based backup image in backup storage, such as backup storage 150 of FIG. 1. Backup module 112 also creates new metadata, such as metadata C 380. Metadata C 380 can be implemented as a backup catalog, and includes information identifying which files are included in user-based backup image 370. Backup module 112 can store metadata 380 as a part of user-based backup image 370. Alternatively, backup module 112 can store metadata C 380 separately from user-based backup image 370, e.g., in metadata 154 of FIG. 1. In one embodiment, a backup image can be created that includes data objects associated with a subset of users, e.g., data associated with multiple users can be included in the backup. Such an embodiment can involves specifying a characteristic common to the multiple users, such as all users who are assigned a specified role in an organization, or users who work in a specified department, or any other suitable characteristic.

Figure 4:
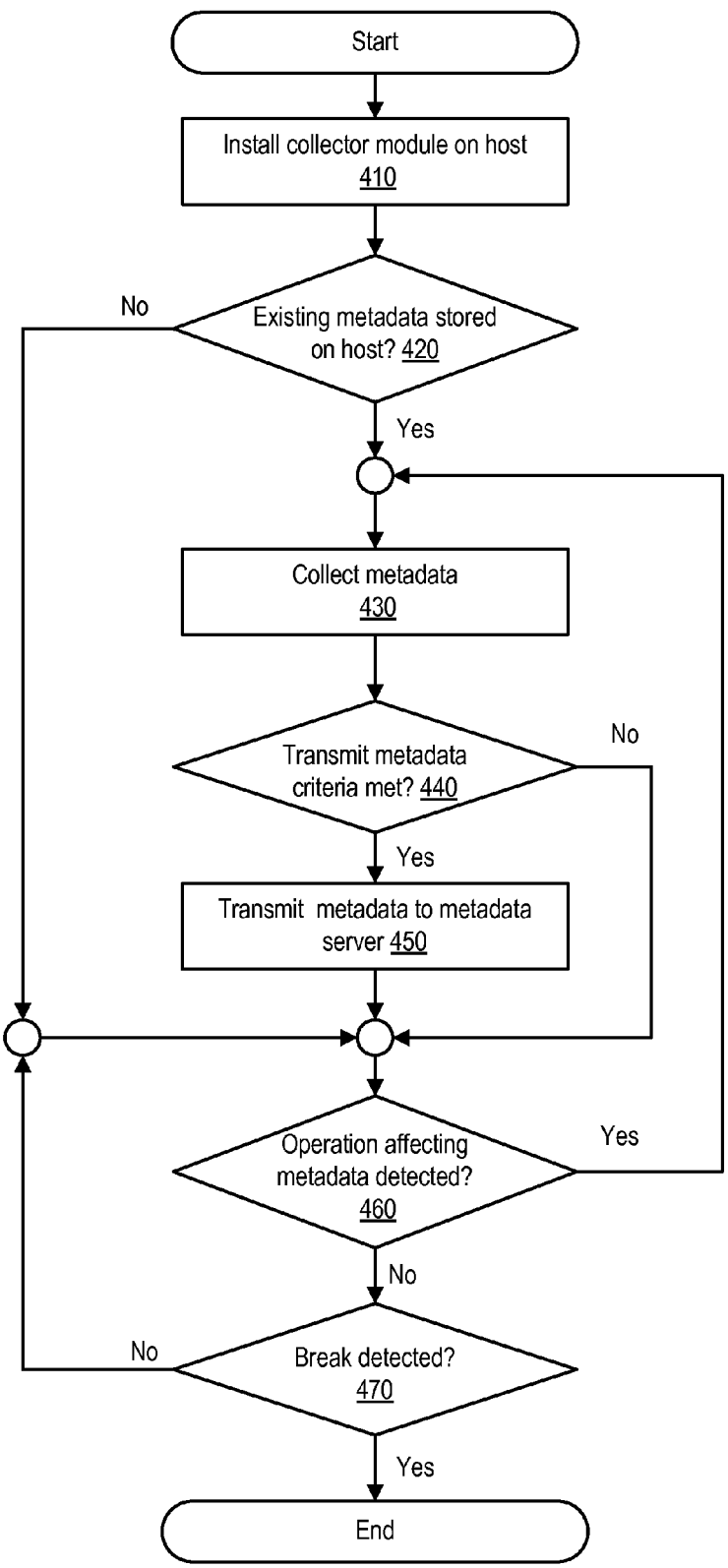
FIG. 4 is a flowchart of a method of collecting metadata, according to one embodiment of the present invention.

FIG. 4 is a flowchart of a process of collecting metadata. This method can be performed by a metadata server, such as metadata server 120 of FIG. 1, and related components. The metadata server communicates with one or more collector modules, such as collector modules 146 and 156 of FIG. 1. At 410, the collector modules are installed on host computers, such as hosts 140. The collector modules can be installed on any type of computing system that stores data objects, such as backup storage 150 of FIG. 1. The collector modules can also be configured to detect certain types of changes to metadata. For example, a collector module can be implemented as an application specific collector module. In this embodiment, the collector module is associated with a single application and only gathers metadata related to data used by the application.

At 420, the collector module detects whether there is existing metadata that can be collected. For example, if the collector module is installed on a host that has data stored on the host, such as data 142 of FIG. 1, the collector module detects that data is stored on the host and that there is metadata associated with the data.

The collector module collects metadata at 430. In one embodiment, this involves detecting and recording various pieces of information, including, for example, ownership information, (e.g., information indicating a user that owns the data), access information, (e.g., information indicating one or more users that have accessed the data and when the access(es) occurred), modification information, (e.g., information indicating when the data was modified, and by whom), as well as location information, (e.g., information indicating what host the data is stored on, as well as where in a file system or other data structure the data is located). The collector module can store this metadata in a list, e.g., a file or database. For example, the collector module can create a list of some or all files. For each file in the list, the collector module can add an entry to the list indicating the owner of the file, when the file was accessed and/or modified, and where the file is stored, (e.g., host and directory path name). If no user is explicitly associated with a given data object, the collector module can infer ownership. That is, the collector module can detect which user is performs the most accesses to the data object and assign ownership of the data object to that user.

The collector module detects whether to transmit the metadata to the metadata server at 440. The collector module can transmit metadata in response to detecting new or updated metadata, in response to detecting an amount of metadata collected, periodically, or in response to detecting that a certain type of metadata is available, e.g. metadata associated with a high priority user or data. Alternatively, the collector module can collect metadata until the metadata is requested by the metadata server, and send the metadata in response to receiving a request for the metadata from the metadata server. If the collector module detects that the metadata should be transmitted to the metadata server, the collector module does so at 450.

The collector module monitors the host to detect any operations that produce a change in metadata. The collector module can detect operations directly, e.g., detect that a file system or storage manager has received a request to access a file, or indirectly, e.g., detect that the file system or storage manager is updating metadata. At 460, the collector module detects an operation. Such an operation can include any of a read operation, a write operation, a modify operation, or the like. In response to detecting the operation, the method returns to 430, where the collector module updates the list of metadata and stores the updated list. If no operation is detected, the collector module continues to monitor until a break is detected, at 470. A break can involve a command to cease monitoring for operations and collecting metadata, (e.g., in preparation for shutting down the host). In response to detecting a break, the process ends.

Figure 5:
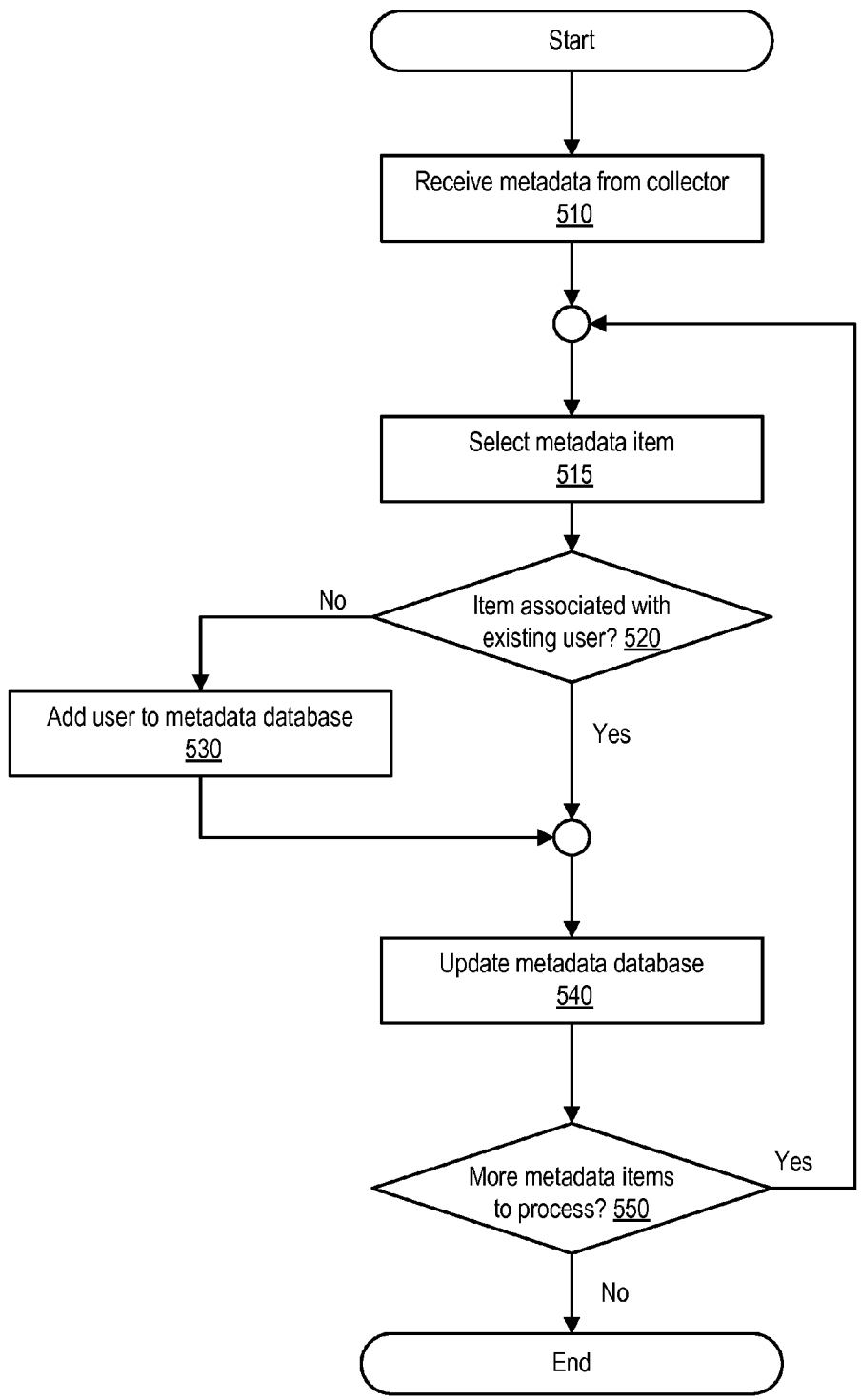
FIG. 5 is a flowchart of a method of maintaining a metadata database, according to one embodiment of the present invention.

FIG. 5 is a flowchart of a method of maintaining a metadata database. This method can be performed by a metadata server, such as metadata server 120 of FIG. 1. In particular, an index module, such as index module 122 maintains the metadata. In one embodiment, the index module processes the metadata to create an index of metadata, such as index 123 of FIG. 1. At 510, the metadata server receives metadata. In one embodiment, the metadata server requests the metadata from one or more collector modules, such as collector modules 146 and 156 of FIG. 1.

The received metadata can include, for example, one or more items of metadata. For example, an item can include information indicating that a new file was created, the location the file is stored, the owner of the file, and the like. A second item can include information indicating that an existing file was accessed by a specific user. The index module selects an item at 515. At 520, the index module detects whether a user associated with the item, e.g., a file's owner, is an existing user. An existing user is a user for which there is already at least one entry in the metadata database. If the user is not included in any entries in the metadata database. The index module updates the metadata database with the item at 540. At 550, the index module detects whether more items were received. If so, the method returns to 515, where the index module selects another entry. In this way, the index module creates and maintains a database of user metadata.

Figure 6:
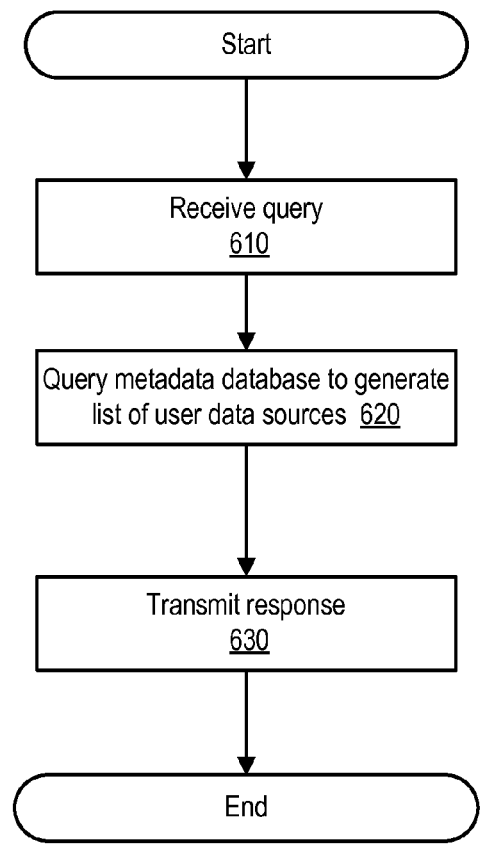
FIG. 6 is a flowchart of a method of distributing metadata, according to one embodiment of the present invention.

FIG. 6 is a flowchart of a method of sharing user metadata. This method can be performed by a metadata server, such as metadata server 120 of FIG. 1. The metadata server receives a query at 610. In one embodiment, the query is received from a backup module, such as backup module 112 of FIG. 1. The query includes a user name. In one embodiment, the query includes additional criteria, such as a range of dates, a type of data, file path, name of host, and the like.

In response to receiving the query, the metadata server generates a list of data sources for the user specified in the query, at 620. The metadata server searches the user metadata and for each data object that is associated with the user, the metadata server adds an entry to the list. Each entry indicates the name and location of the data object. In one embodiment, the metadata server sorts and/or filters the list based, for example, on differentiations between levels of association. The metadata server can include on the list data items which the user owns and has modified, but exclude items the user accessed without modifying. The metadata server can be configured to include all data objects associated with the user in the list, or only selected ones of those data objects. The metadata server can detect which objects to include based on parameters specified in the query, or in response to input from a user, such as a backup administrator. At 630, the metadata server transmits a response including the list of data objects associated with the user to the backup module.

Figure 7:
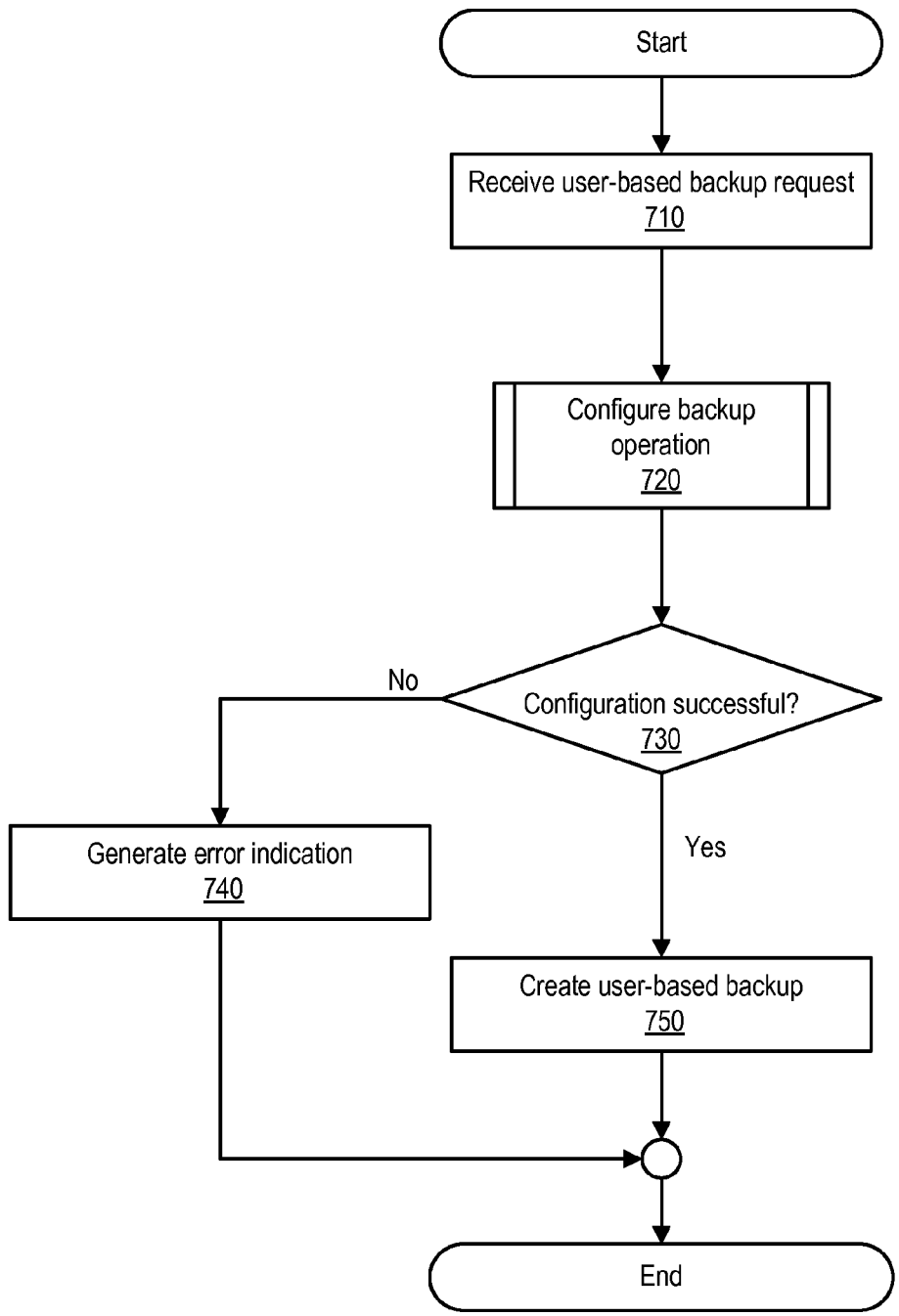
FIG. 7 is a flowchart of a method of generating a user-based backup image, according to one embodiment of the present invention.

FIG. 7 is a flowchart of a method of generating a user-based backup. This method can be performed by a backup module, such as backup module 112 of FIG. 1. At 710, the backup module receives a request for a user-based backup. The request can be generated by a user, e.g., a backup administrator, or can be automatically generated in response to detecting some occurrence. For example, the backup module can detect that a user's status has changed from active to retired. The request can include information specifying a user, as well as a time period, one or more sources, a type of data, and the like.

The backup module configures a backup operation at 720. As discussed in greater detail with regard to FIG. 8, configuring the backup operation involves identifying the locations of data that is to be backed up. At 730, the backup module detects whether configuration was successful. Configuration can be unsuccessful in response to the backup module being unable to identify any data that is associated with the user. If configuration is not successful, the backup module generates an error indication at 740.

Otherwise, the backup module creates a user-based backup at 750. In one embodiment, creating a user-based backup involves creating a copy of multiple data objects from multiple sources and storing the data objects in a single user-based backup image file. Each data object in the user-based backup image is associated with user. The user-based backup image can include some or all data objects associated with the user.

In one embodiment, the backup module creates a logical user-based backup image. A logical user-based backup image involves allocating a user-based backup image file and updating metadata to indicate that the data objects associated with the user are included in the logical user-based backup image, but does not involve actually creating a copy of the data objects and storing the data objects in a separate location.

Figure 8:
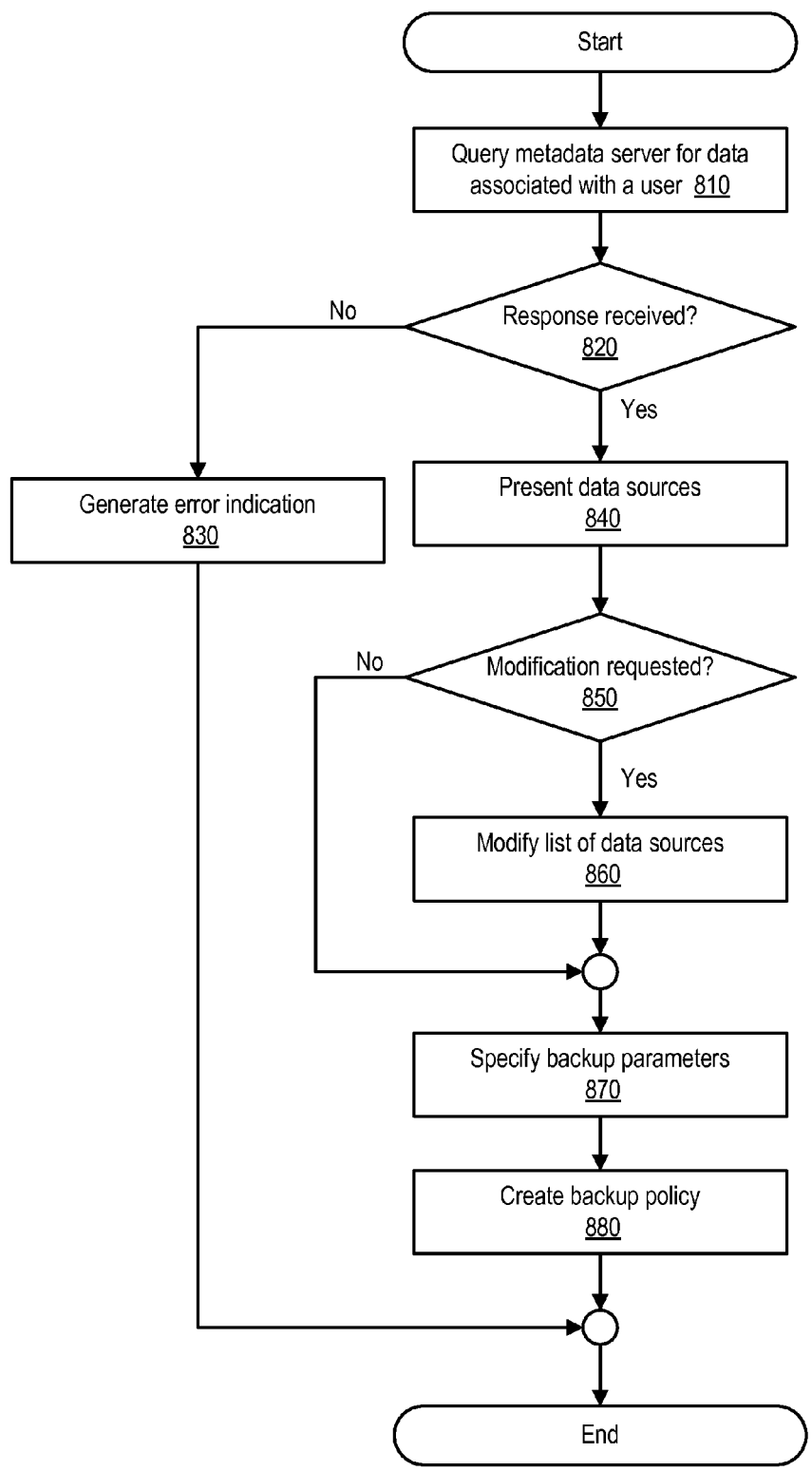
FIG. 8 is a flowchart of a method of configuring a user-based backup operation, according to one embodiment of the present invention.

FIG. 8 is a flowchart of a method of configuring a user-based backup. The method can be performed by a backup module, such as backup module 112 of FIG. 1. At 810, the backup module generates a query and transmits the query to a metadata server, such as metadata server 120 of FIG. 1. The query includes information identifying a user, such as the user's name or position within an enterprise. The query can also include a range of dates. In response to the query, the metadata server accesses metadata, such as user metadata 124 of FIG. 1, to identify data objects associated with the user, and the locations of those data objects. Data objects associated with the user include data objects that the user has modified or otherwise accessed, data objects that the user owns, and the like. If a date is included in the query, the metadata server can filter data that falls outside the specified date range from the results. The metadata server generates results that can include, for example, the locations of some or all data objects associated with the user. The list can include a path to the data, a name of a storage device on which the data is located, the name of a backup image that contains the data, and the like.

At 820, the backup module detects whether a response is received. If no response is received within a pre-specified amount of time, the backup module generates an error indication at 830. Otherwise, in response to receiving the results, the backup module makes the results available, e.g., to a backup administrator, at 840. In one embodiment, making the results available involves displaying a list of data sources which match the criteria specified in the query, e.g, those data sources which include data associated with the specified user. Based on the results received from the metadata server, the backup module can automatically select the type of backup and data sources for the user. Based on the role of the user in the organization, various retention levels can be set on the backup images that will be generated. The backup administrator is enabled to select data which is more important/ relevant for backup rather than select the entire data set for backup, which reduces the quantity of storage space used to store the backup image.

At 850, the backup module detects whether the results are modified. Modifying the results can involve a backup administrator selecting one or more of the data sources to be excluded. For example, the backup administrator might determine that any data objects stored in a "Personal" folder should be excluded from the user-based backup. In one embodiment, the results can indicate that data associated with a user is stored in a location that is no longer accessible to the backup module. Using a system according to the presently described embodiment, the backup administrator can exclude such locations from the backup operation. If the backup module detects modification, the backup module modifies the results at 860.

The backup module specifies other backup parameters at 870, such as when to run the backup, whether to generate a logical backup or a physical backup, where to store the user-based backup image, and the like. At 880, the backup module creates a backup policy. The backup module can use the backup policy to perform a backup operation. The backup policy can be implemented as a file that contains the parameters used to create a user-based backup image. When the backup module executes a backup operation, the backup module accesses the policy to determine the characteristics of the backup operation.

Figure 9:
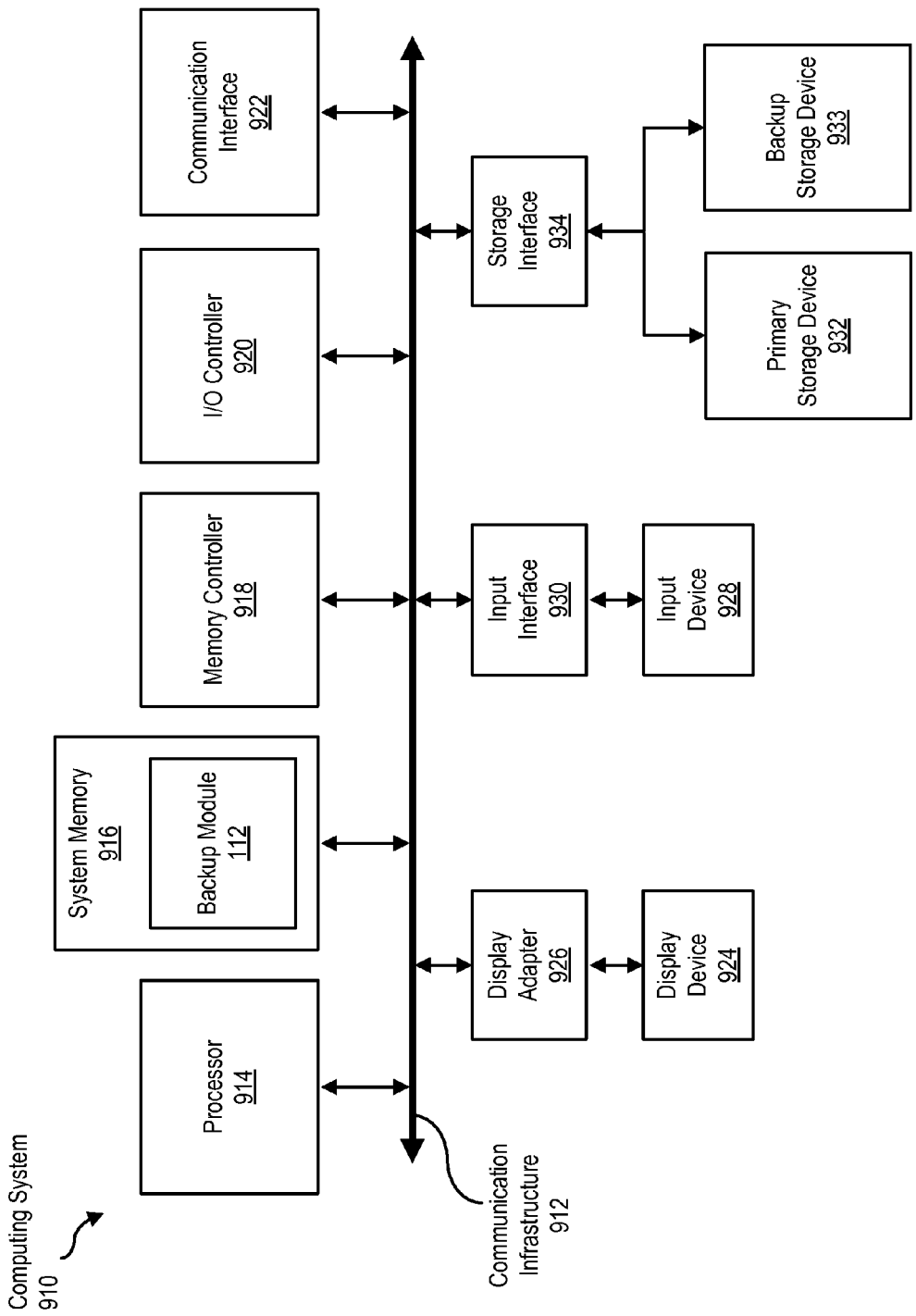
FIG. 9 is a block diagram of a computing device, illustrating how a backup module can be implemented in software, according to one embodiment of the present invention.

FIG. 9 is a block diagram of a computing system 910 capable of configuring and performing user-based backup operations as described above. Computing system 910 broadly represents any single or multi-processor computing device or system capable of executing computer-readable instructions. Examples of computing system 910 include, without limitation, any one or more of a variety of devices including workstations, personal computers, laptops, client-side terminals, servers, distributed computing systems, hand-held devices (e.g., personal digital assistants and mobile phones), network appliances, storage controllers (e.g., array controllers, tape drive controller, or hard drive controller), and the like. In its most basic configuration, computing system 910 may include at least one processor 914 and a system memory 916. By executing the software that implements a backup module 112, computing system 910 becomes a special purpose computing device that is configured to perform backup operations in the manner described above.

Processor 914 generally represents any type or form of processing unit capable of processing data or interpreting and executing instructions. In certain embodiments, processor 914 may receive instructions from a software application or module. These instructions may cause processor 914 to perform the functions of one or more of the embodiments described and/or illustrated herein. For example, processor 914 may perform and/or be a means for performing the operations described herein. Processor 914 may also perform and/ or be a means for performing any other operations, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, program instructions executable to implement a backup module 112 (e.g., as shown in FIG. 1) may be loaded into system memory 916.

In certain embodiments, computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller 918 may perform and/or be a means for performing, either alone or in combination with other elements, one or more of the operations or features described and/or illustrated herein.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 9100, and storage interface 9104.

Communication interface 922 broadly represents any type or form of communication device or adapter capable of facilitating communication between computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 11094 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 922 may also allow computing system 910 to engage in distributed or remote computing. For example, communication interface 922 may receive instructions from a remote device or send instructions to a remote device for execution.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer) for display on display device 924.

As illustrated in FIG. 9, computing system 910 may also include at least one input device 928 coupled to communication infrastructure 912 via an input interface 930. Input device 928 generally represents any type or form of input device capable of providing input, either computer or human generated, to computing system 910. Examples of input device 928 include, without limitation, a keyboard, a pointing device, a speech recognition device, or any other input device.

As illustrated in FIG. 9, computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910. A storage device like primary storage device 932 can store information such as deduplication signatures, backup images and/or a backup catalog.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9.

Computing system 910 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 910 for storage in memory via a network such as the Internet or upon a carrier medium.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the embodiments described and/or illustrated herein. Additionally or alternatively, one or more of the embodiments described and/or illustrated herein may be implemented in firmware and/or hardware. For example, computing system 910 may be configured as an application specific integrated circuit (ASIC) adapted to implement one or more of the embodiments disclosed herein.

Figure 10:
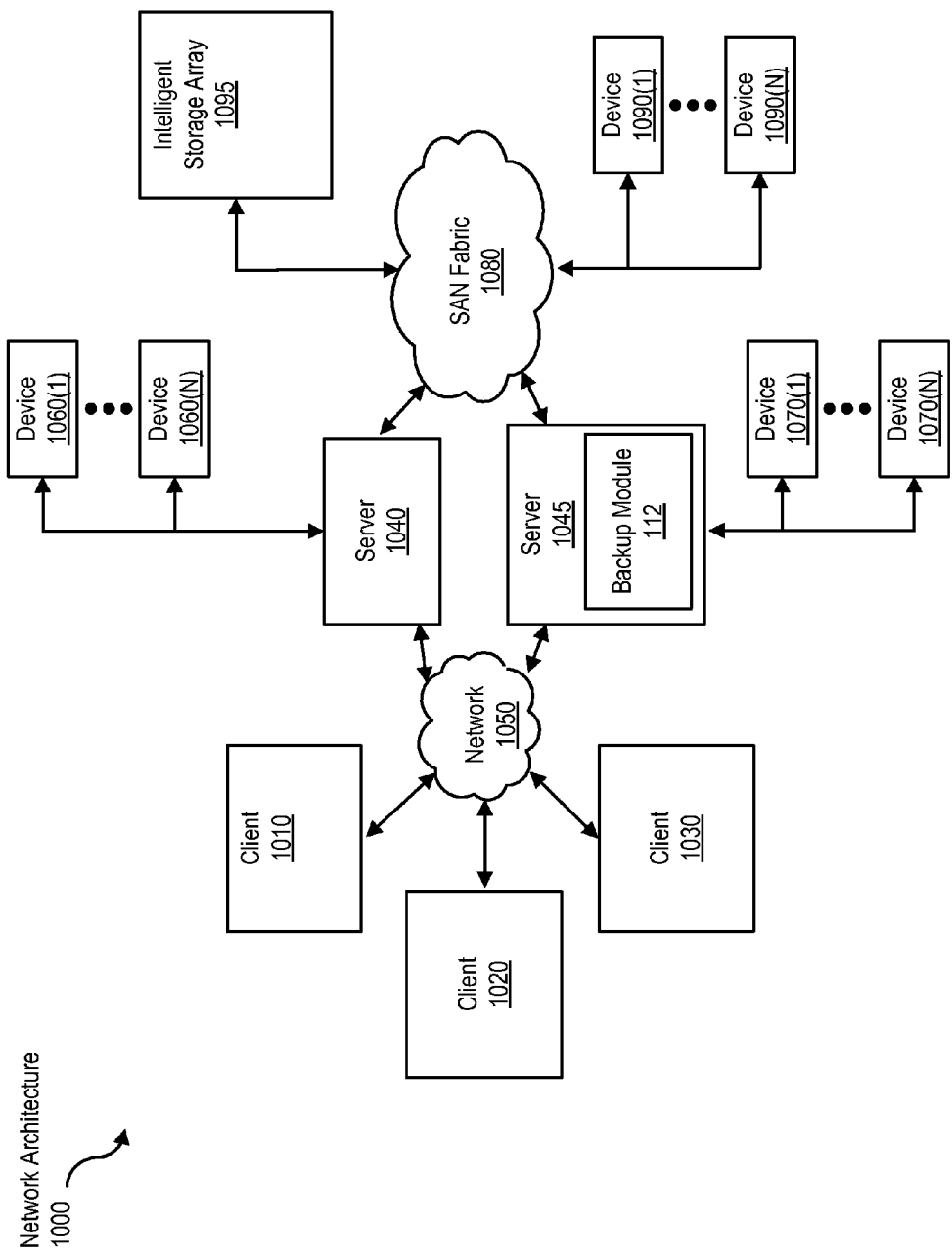
FIG. 10 is a block diagram of a networked system, illustrating how various computing devices can communicate via a network, according to one embodiment of the present invention.

FIG. 10 is a block diagram of a network architecture 1000 in which client systems 1010, 1020, and 1030 and servers 1040 and 1045 may be coupled to a network 1050. Client systems 1010, 1020, and 1030 generally represent any type or form of computing device or system, such as computing system 910 in FIG. 9.

Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet. In one example, one or more of client systems 1010, 1020, and/or 1030 may include a backup module 112 as shown in FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as Network File System (NFS), Server Message Block (SMB), or Common Internet File System (CIFS). Such storage devices can store backup information and storage configuration information, as described above.

Servers 1040 and 1045 may also be connected to a storage area network (SAN) fabric 1080. SAN fabric 1080 generally represents any type or form of computer network or architecture capable of facilitating communication between multiple storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070 (1)-(N), storage devices 1090(1)-(N) and intelligent storage array 1095 generally represent any type or form of storage device or medium capable of storing data and/or other computer-readable instructions.

In certain embodiments, and with reference to computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 1040, server 1045, storage devices 1040(1)-(N), storage devices 1070(1)-(N), storage devices 1090(1)-(N), intelligent storage array 1095, or any combination thereof. All or a portion of one or more of the embodiments disclosed herein may also be encoded as a computer program, stored in server 1040, run by server 1045, and distributed to client systems 1010, 1020, and 1030 over network 1050.

In some examples, all or a portion of one of the systems in FIGS. 1, 9, and 10 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a backup module may transform the behavior of a backup system such that user-based backup image are created.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a request to perform a backup operation, wherein the request includes information identifying a user;
   receiving metadata from a plurality of collector modules, wherein
      the metadata comprises user information and location information for each of a plurality of data objects stored in at least one storage device;
   automatically generating a list of locations at which data objects associated with the user are stored, wherein
      the automatically generating is based on the location information;
   selecting a set of data objects, wherein
      the selecting is based on the user information,
      each data object of the set of data objects is associated with the user,
      the set of data objects comprises a first subset of the plurality of data objects, and the plurality of data objects comprises a second subset associated with a second user; and
generating a user-based backup image, wherein
each data object included in the user-based backup image is included in the set of data objects.

2. The method of claim 1, further comprising:
generating query in response to the request, wherein
the query comprises a request for locations of the set of data objects in the at least one storage device; and
transmitting the query to a metadata server, wherein
the metadata server comprises an index of metadata associated with the at least one storage device.

3. The method of claim 1, further comprising:
identifying a respective location for the each data object of the set of data objects, wherein
the each data object of the set of data objects is stored in at least one backup image, and
the identifying comprises comparing the information identifying the user with information stored in at least one backup catalog associated with the at least one backup image.

4. The method of claim 3, further comprising:
creating a mapping that comprises list of which backup images of the at least one backup image the each data object of the set of data objects is stored in.

5. The method of claim 3, wherein
each backup image of the at least one backup images comprises at least one of an application-based backup image or a host-based backup image, and
each backup image of the at least one backup images comprises respective data objects associated with multiple different users.

6. The method of claim 1, wherein
the generating the user-based backup image comprises forming a logical backup image.

7. The method of claim 1, wherein
the generating the user-based backup image comprises forming a physical backup image.

8. The method of claim 1, further comprising:
excluding a first data object from the set of data objects, wherein
the excluding is based on at least one of
a location associated with the first data object, or
a date associated with the first object.

9. The method of claim 1, wherein
the collector modules of the plurality of collector modules are installed on a plurality of hosts.

10. The method of claim 1, wherein
the location information identifies one or more hosts that store the plurality of data objects.

11. A non-transitory computer readable storage medium storing program instructions executable to:
receive a request to perform a backup operation, wherein
the request includes information identifying a user;
receive metadata from a plurality of collector modules, wherein
the metadata comprises user information and location information for each of a plurality of data objects stored in at least one storage device;
automatically generate a list of locations at which data objects associated with the user are stored, wherein
the automatically generating is based on the location information;
select a set of data objects, wherein
selecting the set of data objects is based on the user information,
each data object of the set of data objects is associated with the user,
the set of data objects comprises a first subset of the plurality of data objects, and
the plurality of data objects comprises a second subset associated with a second user; and
generate a user-based backup image, wherein
each data object included in the user-based backup image is included in the set of data objects.

12. The non-transitory computer readable storage medium of claim 11, wherein the program instructions are further executable to:
generate query in response to the request, wherein
the query comprises a request for locations of the set of data objects in the at least one storage device; and
transmit the query to a metadata server, wherein
the metadata server comprises an index of metadata associated with the at least one storage device.

13. The non-transitory computer readable storage medium of claim 11, wherein the program instructions are further executable to:
identify a respective location for the each data object of the set of data objects, wherein
the each data object of the set of data objects is stored in at least one backup image, and
identifying the respective location comprises
comparing the information identifying the user with information stored in at least one backup catalog associated with the at least one backup image.

14. The non-transitory computer readable storage medium of claim 13, wherein the program instructions are further executable to:
create a mapping that comprises list of which backup images of the at least one backup image the each data object of the set of data objects is stored in.

15. The non-transitory computer readable storage medium of claim 13, wherein
each backup image of the at least one backup images comprises at least one of an application-based backup image or a host-based backup image, and
each backup image of the at least one backup images comprises respective data objects associated with multiple different users.

16. The non-transitory computer readable storage medium of claim 11, wherein
generating the user-based backup image comprises one of
forming a logical backup image, or
forming a physical backup image.

17. A system comprising:
one or more processors; and
a memory coupled to the one or more processors, wherein
the memory stores program instructions executable by the one or more processors to:
receive a request to perform a backup operation, wherein
the request includes information identifying a user;
receiving metadata from a plurality of collector modules, wherein
the metadata comprises user information and location information for each of a plurality of data objects stored in at least one storage device;
automatically generating a list of locations at which data objects associated with the user are stored, wherein
the automatically generating is based on the location information;
select a set of data objects, wherein
selecting the set of data objects is based on the user information, each data object of the set of data objects is associated with the user, the set of data objects comprises a first subset of the plurality of data objects, and the plurality of data objects comprises a second subset associated with a second user; and generate a user-based backup image, wherein each data object included in the user-based backup image is included in the set of data objects.

18. The system of claim 17, wherein the program instructions are further executable to:

generate query in response to the request, wherein the query comprises a request for locations of the set of data objects in the at least one storage device; and transmit the query to a metadata server, wherein the metadata server comprises an index of metadata associated with the at least one storage device.

19. The system of claim 17, wherein the program instructions are further executable to:

identify a respective location for the each data object of the set of data objects, wherein the each data object of the set of data objects is stored in at least one backup image, and identifying the respective location comprises comparing the information identifying the user with information stored in at least one backup catalog associated with the at least one backup image.

20. The system of claim 19, wherein the program instructions are further executable to:

create a mapping that comprises list of which backup images of the at least one backup image the each data object of the set of data objects is stored in.

21. The system of claim 19, wherein each backup image of the at least one backup images comprises at least one of an application-based backup image or a host-based backup image, and each backup image of the at least one backup images comprises respective data objects associated with multiple different users.

22. The system of claim 17, wherein generating the user-based backup image comprises one of forming a logical backup image, or forming a physical backup image.

* * * * *

UNITED STATES PATENT AND TRADEMARK OFFICE
CERTIFICATE OF CORRECTION

| | | |
|---|---|---|
| PATENT NO. | : 9,183,205 B1 | Page 1 of 1 |
| APPLICATION NO. | : 13/645678 | |
| DATED | : November 10, 2015 | |
| INVENTOR(S) | : Abhijit Kurne, Mandar R. Upadhye and Biju Pillai | |

It is certified that error appears in the above-identified patent and that said Letters Patent is hereby corrected as shown below:

Claims

Column 17
Line 45, in Claim 8, replace: "first object" by -- first data object --

Column 18
Line 13, in Claim 12, replace: "generate query" by -- generate a query --

Signed and Sealed this
Tenth Day of May, 2016

Michelle K. Lee
*Director of the United States Patent and Trademark Office*